United States Patent [19]
Elliott

[11] Patent Number: 5,079,644
[45] Date of Patent: Jan. 7, 1992

[54] MULTI-LAYERED REFLECTIVE STRUCTURE AND METHOD OF MAKING SAME

[76] Inventor: Richard C. Elliott, 101 N. Pearl, Ellensburg, Wash. 98926

[21] Appl. No.: 586,002

[22] Filed: Sep. 21, 1990

[51] Int. Cl.⁵ .............................................. G02B 5/136
[52] U.S. Cl. ................................... 359/546; 359/900; 250/515.1
[58] Field of Search ............... 350/320, 103, 105, 109, 350/97, 1.6, 1.7; 250/515.1, 517.1, 519.1

[56] References Cited

U.S. PATENT DOCUMENTS 4,688,894 8/1987 Hockert ............................ 359/536
4,983,436 1/1991 Bailey et al. ...................... 359/536

FOREIGN PATENT DOCUMENTS 638974 3/1962 Canada .............................. 359/536
455738 10/1936 United Kingdom .

Primary Examiner—Loha Ben
Attorney, Agent, or Firm—John M. Johnson

[57] ABSTRACT

A multi-layered reflective structure is comprised of a base, a first layer of first reflective elements secured to the base, and a second layer of second reflective elements secured to portions of the first layer. Additional layers of reflective elements are each secured to portions of the preceding layer of reflective elements.

18 Claims, 2 Drawing Sheets

MULTI-LAYERED REFLECTIVE STRUCTURE AND METHOD OF MAKING SAME

BACKGROUND OF THE INVENTION

This invention relates to reflective signage, or the like, and specifically to multi-layered reflective signage or complex graphics.

Signage comprised of a single layer of reflective elements is disclosed in British Patent No. 455,738 issued to Levy. Levy relates to reflecting signs comprised of basic letters and/or numbers in relatively simple patterns.

The present invention provides a reflective structure having multiple reflective layers that provide actual depth of field (i.e., three-dimensional perspective). Furthermore, the complex patterns associated with the multi-layered reflective structure of the present invention create "illusionistic depth" through the ability to create more complex images.

Also, the present invention allows the creation of complex colored and shaded renderings that are similar in appearance to creations using the four color photograph separation technique. Specifically, the use of a plurality of reflectors in multiple layers, each reflector being one of two or more basic colors (for example, any two or more of red, blue, green, yellow, white, or grey-black), allows creation of photograph quality signage and artwork having a multitude of subtle color shades, tones, and tints when viewed by the human eye. In this manner, realistic images of people, places and things with true, subtle color representation can be created.

SUMMARY OF THE INVENTION

The present invention is a multi-layered reflective structure comprised of a first layer of reflective elements and a second layer of reflective elements stacked and affixed onto portions of the first layer. Additional layers of reflective elements are each stacked and affixed onto portions of the preceding layer of reflective elements.

In a preferred embodiment, the first layer of reflective elements is affixed to a base. Adhesive is used to secure the first layer to the base and to secure the second and subsequent layers to their respective preceding layers. The reflector elements are internally faceted plastic reflectors being either circular or rectangular (preferably square) in shape.

BRIEF DESCRIPTION OF THE DRAWINGS

A more complete appreciation of the invention may be had by reference to the accompanying drawings illustrating preferred embodiments of the invention to be described in detail, wherein.

DETAILED DESCRIPTION OF THE PREFERRED EMBODIMENT

Figure 1:
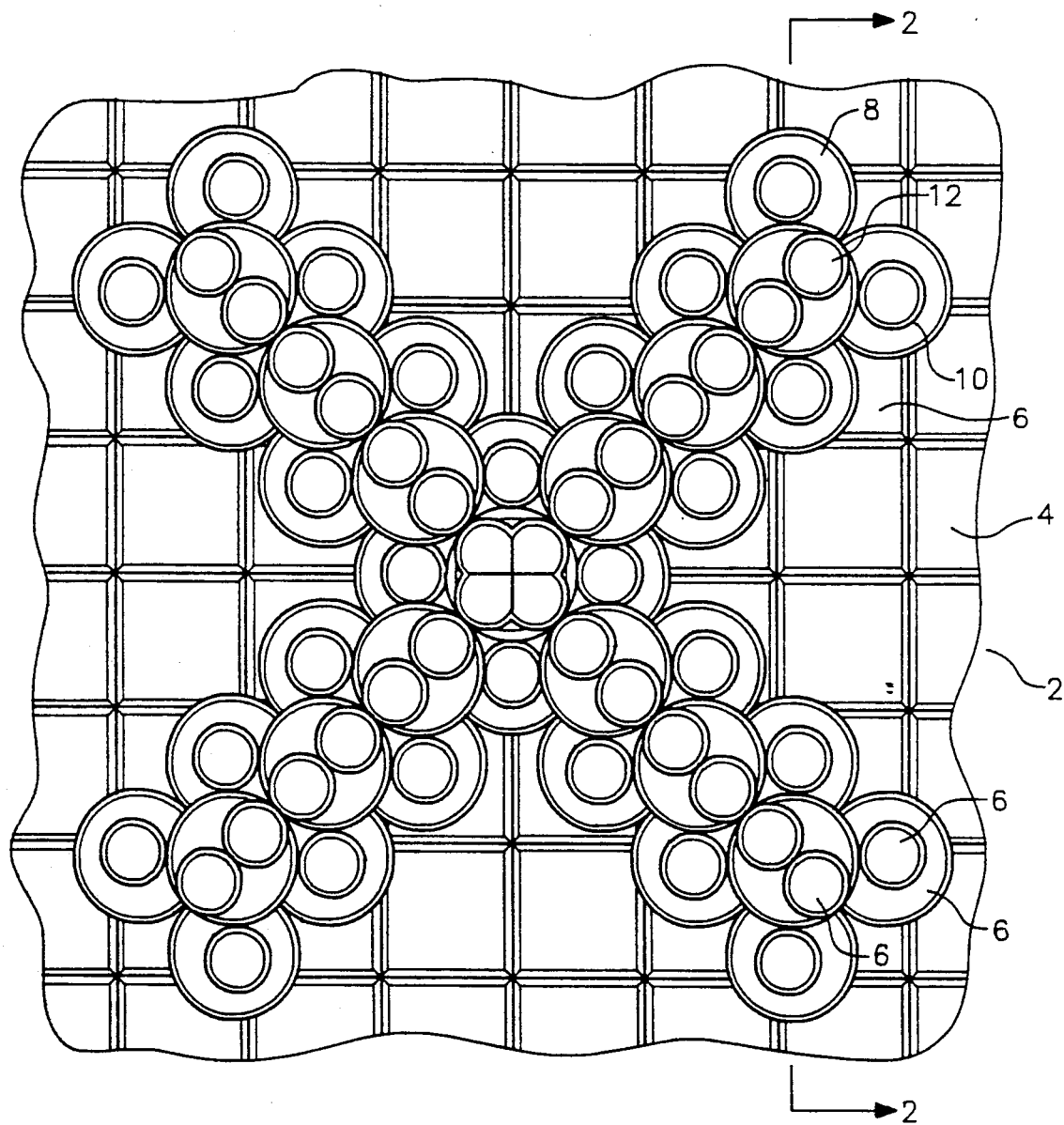
FIG. 1 is a plan view of an exemplary multi-layered structure constructed in accordance with the present invention.
Figure 2:
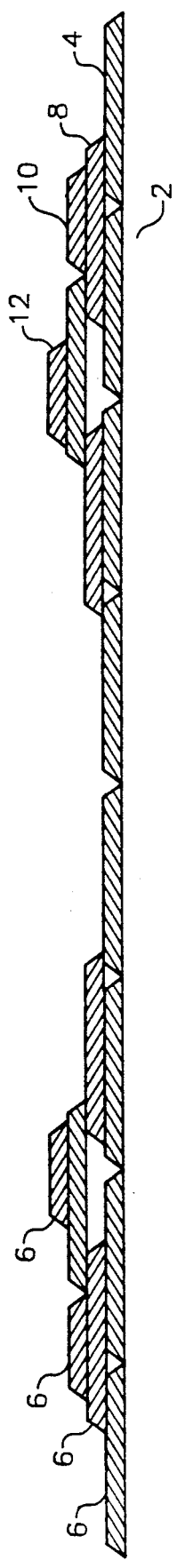
FIG. 2 is a cross-sectional view of the exemplary multi-layered structure of FIG. 1 taken along line 2—2.

FIG. 1 and FIG. 2 show an exemplary multi-layered reflective structure 2 employing layers comprised of separate reflective elements. Structure 2, in the form of an "X", is merely exemplary of the structures that can be created with the present invention and is not intended to limit the scope of the invention.

Specifically, an optional backing (not shown) comprised of plastic, wood, metal or other material with sufficient rigidity to support structure 2 can be employed as a base on which to affix first layer 4.

First layer 4, second layer 8, third layer 10, and fourth layer 12 are comprised of a plurality of separate reflecting elements 6. While the present example shows only four layers, it will be appreciated that a greater or fewer number of layers can be employed.

The reflecting elements 6 comprising first layer 4, second layer 8, third layer 10 and fourth layer 12 are divided into these separate, distinct stacked layers based upon their height above the backing, which is a function of the thickness "t" of each reflecting element 6 and the relative location of each reflecting element 6 on the top surface of other reflecting elements. If, for example, all reflecting elements 6 employed are of the same thickness "t", then all of the reflecting elements 6 comprising third layer 10 would be a height of 3 t from the backing. In sum, particular reflecting elements 6 are members of a specific layer when all of these reflecting elements 6 have top surfaces substantially in a common plane, or in other words, are the same height above the backing. It is readily apparent that if the thickness value "t" is not constant for all reflecting elements 6, then, while all reflecting elements 6 in each layer will be the same height above the backing as all other reflecting elements in that layer, this height relationship between the reflecting elements 6 can no longer be expressed as a function of a common thickness value "t".

First layer 4 may be comprised of a plurality of square and/or rectangular shaped reflective elements 6 that mesh edge to edge with little or no gap there between. Thus, first layer 4 may be comprised of a plurality of reflective elements 6 that reflect visible light as a singular unit to provide a reflecting background with essentially no non-reflecting portions.

Alternatively, round reflective elements 6 may be employed in first level 4 to enhance the complexity of the graphic artwork produced. The complexity of the graphic artwork is enhanced due to the presence of gaps between reflective elements 6 in the various layers as discussed more fully below.

Stacked second layer 8, third layer 10 and fourth layer 12 are shown in FIGS. 1 and 2 to be comprised of circular reflective elements. However, other shapes of reflective elements 6, examples including FIGS. 3A, 3B and 3C, may be employed. The relative location and pattern of reflective element 6 in second layer 8, third layer 10, fourth layer 12 and any subsequent layers is a function of the rendering being created (for example, the "X" of FIGS. 1 and 2), the amount of structural depth (three dimensional perspective) desired, and the authenticity of the creation when compared to the actual subject. In general, however, second layer 8 is to be stacked onto a portion of first layer 4 that is less than the entire surface of first layer 4. Thus, subsequent layers are to be affixed to the immediately preceding layers such that the subsequent layer of reflective elements 6 does not entirely cover the preceding layer. However, at times the creator may desire a subsequent layer of reflective elements 6 to totally cover the surface area of an immediately preceding layer for either artistic or informational purposes.

Regarding the level of authenticity in relation to the actual subject, if a very realistic rendering is desired, an extremely large number (thousands or more) of reflective elements 6, each having one of two or more basic colors (for example, any two or more of red, blue, green, yellow, white or grey-black) are employed to obtain a result similar to the traditional four color photograph separation technique. In this manner, the basic discrete colors of the separate reflective elements 6, when viewed by the human eye, appear instead as a plurality of subtle colors of various hues, shades, tones and tints based on the relative four color concentration of, for example, red to blue to green to yellow to white to grey-black in any given area of the creation. Thus, depending on the amount of reflective elements 6 employed, representations of near photographic quality can be created.

Alternatively, reflective elements 6 can be employed, each of which has one or more of a multitude of different colors, hues, shades, tones and tints, as opposed to one of the basic colors, to obtain complex photograph-like renderings. In sum, each level can be comprised of reflective elements 6 having the same color; of reflective elements 6, each of which is comprised of a single one of a finite number of basic colors; and/or of reflective elements 6, each of which is comprised of a plurality of complex colors.

The reflective elements 6 of third layer 10 may be stacked on second layer 8 (and the reflective elements 6 of fourth layer 12 may be stacked on third layer 10) such that any gaps between adjacent reflective elements 6 of the previous layer are covered. As shown in FIG. 2, gaps exist between each of the two pair of adjacent reflective elements 6 comprising second layer 8 such that the portion of first layer 4 between these second layer 8 elements would be visible to the viewer if these gaps were not covered by two reflective elements 6 in third layer 10.

However, the creator may desire gaps to exist showing lower reflective layers between reflective elements of upper reflective layers for artistic or informational effect. Specifically, the presence of gaps in upper layers through which light reflecting off of reflective elements 6 in lower layers results in both more complex graphic lines (and thus more complex images) and also results in more complex colors due to "color mixing". For example, if a gap exists in second layer 8 (consisting of red reflective elements 6) through which a blue reflective element 6 of first layer 4 reflects light, the color perceived by the human eye will be a combination of the red and blue reflected light, thus producing a red with purple tint, or an actual purple color. It is readily apparent that the designer/artist can use the colors of the reflective elements 6 in combination with the relative size of the lower level gaps to the size of the surface area of upper level reflectors to create almost any color desired by this "color mixing". In other words, the color perceived by the human eye will be a function of the colors of the reflective elements 6 and the relative surface area of the reflective elements 6 of each color in each level.

Reflective elements 6 of first layer 4 are preferably affixed to the backing with a commercially available adhesive such as cyanoacrylic adhesive, silicone adhesive or rubber cement placed on the bottom side of reflective elements 6. However, other commercially available adhesives may be employed. Likewise, subsequent layers are preferably affixed to lower layers in the same manner. Alternatively, reflective elements 6 may employ an adhesive tape backing commercially applied to the back of each individual reflective element. In yet another embodiment, a support frame or mounting brackets (not shown) can be used to mount the individual reflective elements 6, and the support frame or mounting brackets can be secured to the backing by adhesive, screws, bolts, nails or the like.

Figure 3A:
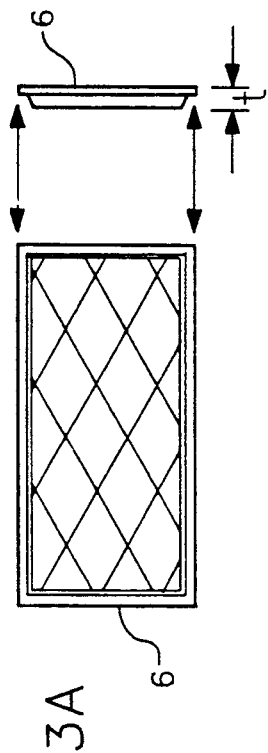
FIGS. 3A, 3B and 3C are top and side views of three exemplary reflector elements of the present invention.
Figure 3C:
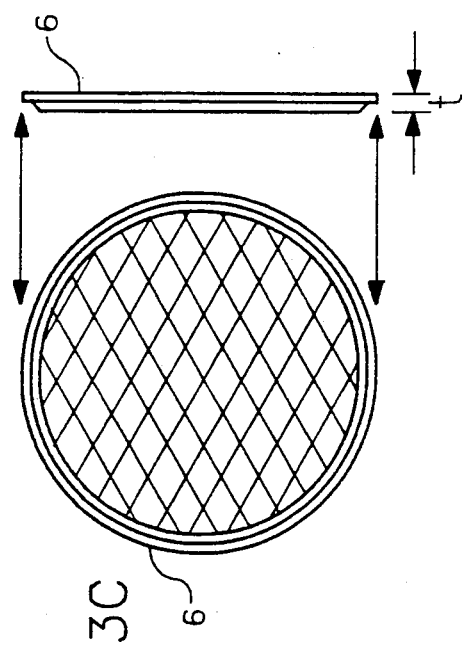
Figure 3B:
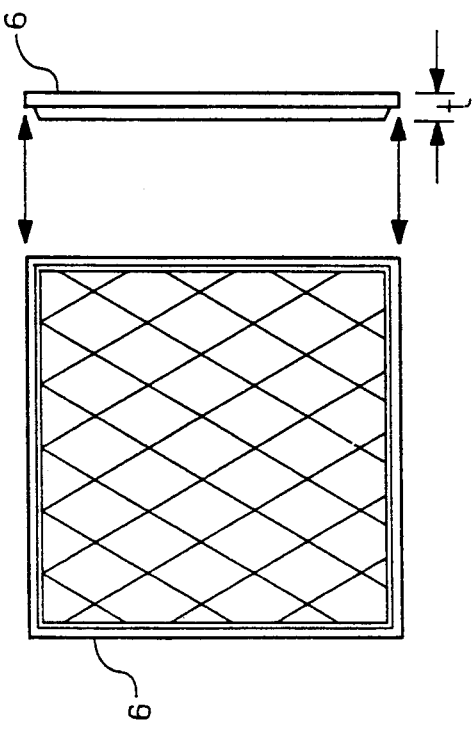

Referring to FIGS. 3A, 3B and 3C, reflective elements 6 may be of any shape, but are preferably rectangular, square, or round. If rectangular, reflective elements 6 are preferably between about 3" to about 4" in width, about 1" to about 2" in height and about $\frac{1}{4}$" in thickness. If square, reflective elements 6 are preferably between about 3" to 4" on a side and about $\frac{1}{4}$ in thickness. If circular, reflective elements are preferably about 13/16" to about 4 7/32" in diameter and about $\frac{1}{4}$" in thickness. The above dimensions are the preferred dimensions. However, the reflective elements 6 may be larger or smaller in size depending on the size of the rendering and the intended effect.

Reflective elements 6 are preferably smooth surfaced plastic reflectors having interior facets, well known in the art. However, glass faceted reflectors, or reflective plastic or glass beads embedded in glass or plastic, or reflective tape affixed to a non-reflective thickened surface may all be employed.

While particular embodiments of the present invention have been described in some detail herein above, changes and modifications may be made in the illustrated embodiments without departing from the spirit of the invention.

I claim:

1. A multi-layered reflective structure comprising:
   a first layer of first reflective elements;
   a second layer of second reflective elements on at least portions of said first layer; and
   at least one additional layer of reflective elements, said additional layer of reflective elements being on at least portions of a preceding layer of reflective elements.

2. The multi-layered reflective structure of claim 1, wherein said second layer of second separate reflective elements is oriented on said first layer of first separate reflective elements so that a portion of said first layer substantially bounded by said second layer is visible.

3. The multi-layered reflective structure of claim 1, wherein said first layer of first reflective elements is secured to said second layer by adhesive.

4. The multi-layered reflective structure of claim 1, wherein at least one of said first and second layers of reflective elements is internally faceted.

5. The multi-layered reflective structure of claim 1, wherein at least one of said first and second layers of reflective elements is plastic.

6. The multi-layered reflective structure of claim 1, wherein at least one of said first and second layers of reflective elements is circular with a diameter of between about 13/16" and 4 7/32".

7. The multi-layered reflective structure of claim 1, wherein at least one of said first and second layers of reflective elements is rectangular with a width of between about 3" and 4".

8. The multi-layered reflective structure of claim 1, further comprising a base on which said first layer is secured by first attachment means.

9. A multi-layered reflective structure comprising:
   a base;

a plurality of first reflective elements on said base, said first reflective elements having top surfaces substantially aligned in a common plane;

first means for securing said first reflective elements in a first layer on said base;

a plurality of second reflective elements, said second reflective elements having top surfaces substantially aligned in a second common plane and forming a second layer on at least a portion of the first layer; and second means for securing said second reflective elements in the second layer, said plurality of second reflective elements oriented on said first layer so that a portion of said plurality of first reflective elements substantially bounded by a portion of said plurality of second reflective elements is visible.

10. The multi-layered reflective structure of claim 9, further comprising:

a plurality of third reflective elements, said third reflective elements having top surfaces aligned to be substantially in a third common plane and forming a third layer on at least a portion of the second layer; and third means for securing said third reflective elements in the third layer.

11. The multi-layered reflective structure of claim 10, further comprising:

additional reflective elements, said additional reflective elements having top surfaces, said top surfaces of each additional reflective element substantially aligned to be substantially in a common plane with at least some of said top surfaces of other additional reflective elements and forming additional layers each of which is on at least a portion of a preceding layer; and additional means for securing said additional reflective elements in the additional layers.

12. The multi-layered reflective structure of claim 9, wherein said first means for securing said first reflective elements and said second means for securing said second reflective elements are adhesives respectively affixed to bottom surfaces of said first elements and said second elements.

13. The multi-layered reflective structure of claim 9, wherein at least one of said first and second layers of reflective elements is internally faceted.

14. The multi-layered reflective structure of claim 9, wherein at least one of said first and second layers of reflective elements is plastic.

15. The multi-layered reflective structure of claim 9, wherein at least one of said first and second layers of reflective elements is circular with a diameter of between about 13/16" and 4 7/32".

16. The multi-layered reflective structure of claim 9, wherein at least one of said first and second layers of separate reflective elements is rectangular with a width of between about 3" and 4".

17. A method of making a multi-layered reflective structure comprising the steps of:

securing a first layer of first reflective elements onto a base;

securing a second layer of second reflective elements onto at least portions of said first layer; and securing at least one additional layer of additional reflective elements to at least portions of a preceding layer of separate reflective elements.

18. The method of claim 17, wherein adhesive affixed to bottom surfaces of said first reflective elements and said second reflective elements secures said first layer and said second layer.

* * * * *